(12) United States Patent
Kato

(10) Patent No.: US 10,968,858 B2
(45) Date of Patent: Apr. 6, 2021

(54) INTERNAL COMBUSTION ENGINE AND CONTROL DEVICE FOR INTERNAL COMBUSTION ENGINE

(71) Applicant: TOYOTA JIDOSHA KABUSHIKI KAISHA, Toyota (JP)

(72) Inventor: Yoshiya Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 5 days.

(21) Appl. No.: 16/376,516

(22) Filed: Apr. 5, 2019

(65) Prior Publication Data

US 2019/0309702 A1 Oct. 10, 2019

(30) Foreign Application Priority Data

Apr. 9, 2018 (JP) .............................. JP2018-074836

(51) Int. Cl.
*F02D 41/40* (2006.01)
*F02D 35/02* (2006.01)
(Continued)

(52) U.S. Cl.
CPC .......... *F02D 41/403* (2013.01); *F02D 35/023* (2013.01); *F02D 35/028* (2013.01);
(Continued)

(58) Field of Classification Search
CPC .... F02D 41/403; F02D 35/028; F02D 41/401; F02D 41/3035; F02D 41/405;
(Continued)

(56) References Cited

U.S. PATENT DOCUMENTS

2010/0312454 A1* 12/2010 Nada ..................... F02D 41/403
701/103
2011/0005491 A1* 1/2011 Terada .................. F02D 41/403
123/299
(Continued)

FOREIGN PATENT DOCUMENTS

EP 2 551 499 A1 1/2013
EP 3 150 833 A1 4/2017
(Continued)

*Primary Examiner* — Hung Q Nguyen
*Assistant Examiner* — Susan E Scharpf
(74) *Attorney, Agent, or Firm* — Sughrue Mion, PLLC

(57) ABSTRACT

A control device for an internal combustion engine provided with a combustion control part successively performing at least first main fuel injection and second main fuel injection and making the fuel burn by premix charged compressive ignition so as to cause generation of heat two times in stages inside the combustion chamber and cause the pressure waveform showing the change along with time of a rate of cylinder pressure rise to become a two-peak shape. The combustion control part calculates a second premix time of fuel injected by the second main fuel injection with air, reduces the injection amount of the second main fuel injection so that the second premix time becomes a first threshold value or more and performs after fuel injection after the second main fuel injection when the second premix time is less than the first threshold value, and injects the amount of fuel reduced from the injection amount of the second main fuel injection by the after fuel injection.

6 Claims, 5 Drawing Sheets

(51) Int. Cl.
*F02D 41/14* (2006.01)
*F02D 41/30* (2006.01)
*F02D 41/38* (2006.01)

(52) U.S. Cl.
CPC ..... *F02D 41/1497* (2013.01); *F02D 41/3035* (2013.01); *F02D 41/401* (2013.01); *F02D 41/405* (2013.01); *F02D 2041/389* (2013.01)

(58) Field of Classification Search
CPC ............... F02D 35/023; F02D 41/1497; F02D 2041/389; F02D 41/38
See application file for complete search history.

(56) References Cited

U.S. PATENT DOCUMENTS

| | | | | |
|---|---|---|---|---|
| 2011/0180039 A1* | 7/2011 | Nada | ................ | F02D 41/3827 123/445 |
| 2011/0320108 A1* | 12/2011 | Morinaga | ............ | F02D 41/405 701/105 |
| 2012/0000197 A1* | 1/2012 | Maruyama | .......... | F02D 41/0057 60/605.2 |
| 2012/0004826 A1* | 1/2012 | Shimo | .................... | F02P 5/153 701/103 |
| 2012/0046854 A1* | 2/2012 | Sangkyu | ................ | F02M 26/10 701/108 |
| 2015/0090217 A1* | 4/2015 | Kuzuyama | ............ | F02D 41/401 123/299 |
| 2016/0341135 A1 | 11/2016 | Shirahashi et al. | | |
| 2017/0234249 A1* | 8/2017 | Sakai | ................. | F02D 41/0025 123/295 |
| 2017/0363020 A1* | 12/2017 | Okada | .................. | F02D 41/006 |

FOREIGN PATENT DOCUMENTS

| | | |
|---|---|---|
| EP | 3 236 054 A1 | 10/2017 |
| JP | 4180278 B2 | 11/2008 |
| JP | 2012-031843 A | 2/2012 |
| JP | 2015-068284 A | 4/2015 |
| JP | 2015-078617 A | 4/2015 |
| JP | 2016-217215 A | 12/2016 |
| JP | 2017-194036 A | 10/2017 |
| WO | 01/86126 A2 | 11/2001 |

* cited by examiner

INTERNAL COMBUSTION ENGINE AND CONTROL DEVICE FOR INTERNAL COMBUSTION ENGINE

CROSS-REFERENCE TO RELATED APPLICATION

This application claims priority based on Japanese Patent Application No. 2018-074836 filed with the Japan Patent Office on Apr. 9, 2018, the entire contents of which are incorporated into the present specification by reference.

FIELD

The present disclosure relates to an internal combustion engine and a control device for an internal combustion engine.

BACKGROUND

Japanese Unexamined Patent Publication No. 2015-068284 discloses a conventional control device for an internal combustion engine for realizing premix charged compressive ignition (PCCI) by injecting fuel divided into a first stage injection and a second stage injection so that the shape of a combustion waveform showing a change of heat generation rate along with time (heat generation rate pattern) becomes a shape with two peaks. According to Japanese Unexamined Patent Publication No. 2015-068284, it is considered possible to reduce combustion noise due to this.

SUMMARY

However, if performing premix charged compressive ignition, sometimes the premix time of fuel and air will become shorter compared with the time of steady state operation such as, for example, at the time of transitional operation where the engine load increases. If the premix time is short, clumps of air-fuel mixture with higher fuel concentrations will be burned compared with when the premix time is long. For this reason, oxygen will become insufficient resulting in a greater amount of soot causing smoke, that is, soot, being produced and resulting in exhaust emissions liable to deteriorate. Further, if, like in the above-mentioned Japanese Unexamined Patent Publication No. 2015-068284, performing a first stage injection and second stage injection for premix charged compressive ignition, in particular the premix time of the second stage injected fuel with air will easily become shorter and the exhaust emissions will easily deteriorate.

The present disclosure was made focusing on such a problem and has as its object to keep soot from being formed and causing smoke and thereby keep the exhaust emissions from deteriorating.

To solve this problem, according to one aspect of the present disclosure, there is provided a control device for an internal combustion engine. The internal combustion engine comprises an engine body and a fuel injector injecting fuel for burning in a combustion chamber of the engine body. The control device comprises a combustion control part configured to cause heat to be generated in the combustion chamber two times in stages to give a pressure waveform showing a change over time of a rate of cylinder pressure rise which has two peaks by successively performing at least a first main fuel injection and a second main fuel injection so as to cause premix charged compressive ignition of fuel. The combustion control part comprises a second premix time calculating part calculating a second premix time which is an estimated value of a premix time of fuel injected by the second main fuel injection with the air. The combustion control part is configured to reduce the fuel injection amount of the second main fuel injection so that the second premix time becomes a predetermined first threshold value or more and perform after fuel injection after the second main fuel injection when the second premix time is less than the first threshold value, and to inject the amount of fuel reduced from the injection amount of the second main fuel injection by the after fuel injection.

Further, to solve this problem, according to another aspect of the present disclosure, there is provided an internal combustion engine comprising an engine body, a fuel injector injecting fuel for making it burn inside a combustion chamber of the engine body, and a control device configured to cause heat to be generated in the combustion chamber two times in stages to give a pressure waveform showing a change over time of a rate of cylinder pressure rise which has two peaks by successively performing at least a first main fuel injection and a second main fuel injection so as to cause premix charged compressive ignition of fuel. The control device is further configured to calculate a second premix time which is an estimated value of a premix time of fuel injected by the second main fuel injection with the air, reduce the fuel injection amount of the second main injection so that the second premix time becomes a predetermined first threshold value or more and perform an after fuel injection after the second main fuel injection when the second premix time is less than the first threshold value, and inject the amount of fuel reduced from the injection amount of the second main fuel injection by the after fuel injection.

According to this aspect of the present disclosure, it is possible to keep the premix time period of fuel injected by the second main fuel injection from becoming less than the first threshold value, so it is possible to keep soot from being formed and causing smoke and thereby keep the exhaust emissions from deteriorating.

DESCRIPTION OF EMBODIMENTS

Figure 1:
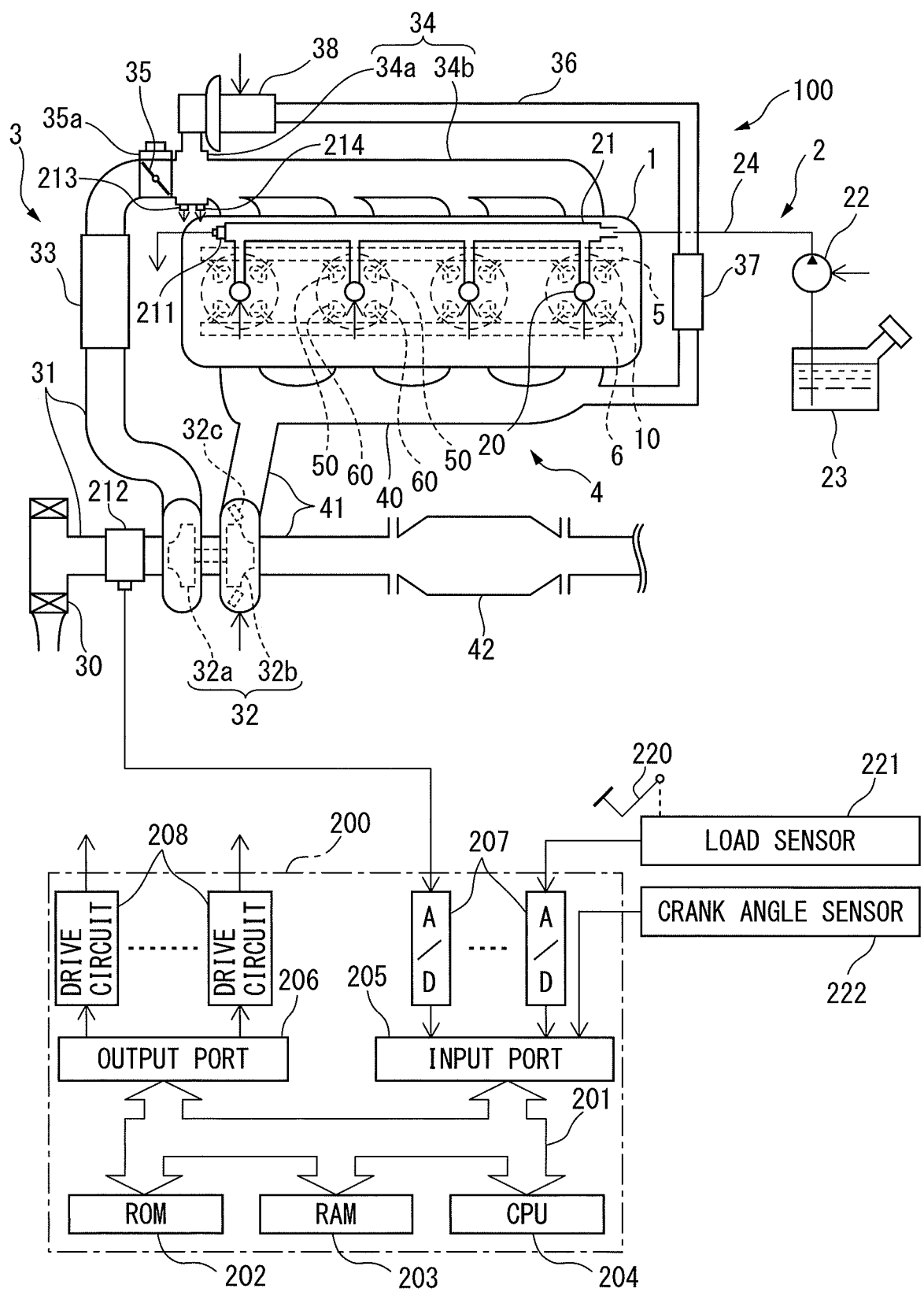
FIG. 1 is a schematic view of the configuration of an internal combustion engine according to one embodiment of the present disclosure and an electronic control unit controlling the internal combustion engine.

Below, referring to the drawings, embodiments of the present disclosure will be explained in detail. Note that, in the following explanation, similar component elements will be assigned the same reference numerals.

Figure 2:
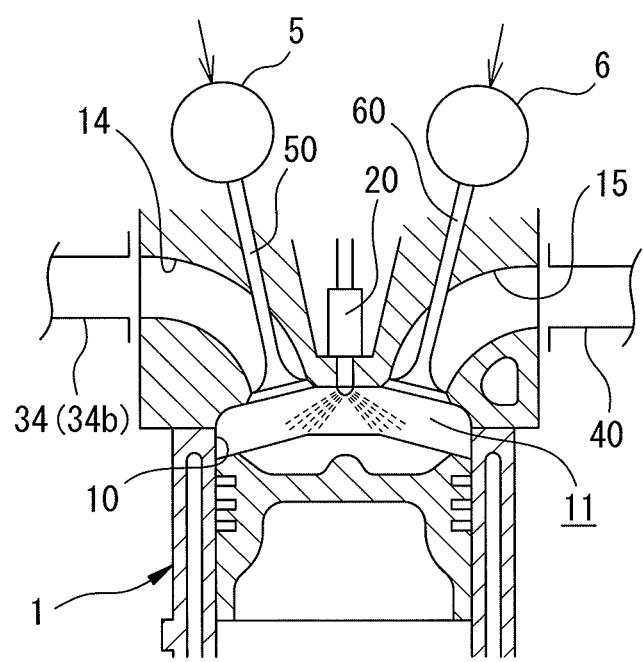
FIG. 2 is a cross-sectional view of an engine body of an internal combustion engine according to one embodiment of the present disclosure.

FIG. 1 is a schematic view of the configuration of an internal combustion engine 100 according to one embodiment of the present disclosure and an electronic control unit 200 controlling the internal combustion engine 100. FIG. 2 is a cross-sectional view of an engine body 1 of the internal combustion engine 100.

As shown in FIG. 1, the internal combustion engine 100 is provided with an engine body 1 provided with a plurality of cylinders 10, a fuel supply system 2, an intake system 3, an exhaust system 4, an intake valve operating system 5, and an exhaust valve operating system 6.

The engine body 1 makes fuel burn in combustion chambers 11 formed in the cylinders 10 (see FIG. 2) to for example generate power for driving a vehicle etc. The engine body 1 is provided with a pair of intake valves 50 and a pair of exhaust valves 60 for each cylinder.

The fuel supply system 2 is provided with electronic control type fuel injectors 20, a delivery pipe 21, supply pump 22, fuel tank 23, pumping pipe 24, and fuel pressure sensor 211.

One fuel injector 20 is provided at each cylinder 10 so as to face a combustion chamber 11 of the cylinder 10 so as to enable fuel to be directly injected into the combustion chamber 11. The opening time (injection amount) and opening timing (injection timing) of the fuel injector 20 are changed by control signals from the electronic control unit 200. If a fuel injector 20 is operated, fuel is directly injected from the fuel injector 20 to the inside of the combustion chamber 11.

The delivery pipe 21 is connected through the pumping pipe 24 to the fuel tank 23. In the middle of the pumping pipe 24, a supply pump 22 is provided for pressurizing the fuel stored in the fuel tank 23 and supplying it to the delivery pipe 21. The delivery pipe 21 temporarily stores the high pressure fuel pumped from the supply pump 22. If a fuel injector 20 is operated, the high pressure fuel stored in the delivery pipe 21 is directly injected from the fuel injector 20 to the inside of a combustion chamber 11.

The supply pump 22 is configured to be able to change the discharge amount. The discharge amount of the supply pump 22 is changed by a control signal from the electronic control unit 200. By controlling the discharge amount of the supply pump 22, the fuel pressure inside the delivery pipe 21, that is, the injection pressure of the fuel injector 20, is controlled.

A fuel pressure sensor 211 is provided in the delivery pipe 21. The fuel pressure sensor 211 detects the fuel pressure inside the delivery pipe 21, that is, the pressure of the fuel injected from the fuel injectors 20 to the insides of the cylinders 10 (injection pressure).

The intake system 3 is a system for guiding air to the insides of the combustion chambers 11 and is configured to enable change of the state of air taken into the combustion chambers 11 (intake pressure (supercharging pressure), intake temperature, and amount of EGR (exhaust gas recirculation) gas). That is, the intake system 3 is configured to be able to change the oxygen density inside the combustion chambers 11. The intake system 3 is provided with an air cleaner 30, intake pipe 31, compressor 32a of a turbocharger 32, intercooler 33, intake manifold 34, electronic control type throttle valve 35, air flow meter 212, EGR passage 36, EGR cooler 37, and EGR valve 38.

The air cleaner 30 removes sand and other foreign matter contained in the air.

The intake pipe 31 is coupled at one end to an air cleaner 30 and is coupled at the other end to a surge tank 34a of the intake manifold 34.

The turbocharger 32 is a type of supercharger. It uses the energy of the exhaust to forcibly compress the air and supplies the compressed air to the combustion chambers 11. Due to this, the charging efficiency is enhanced, so the engine output increases. The compressor 32a is a part forming a portion of the turbocharger 32 and is provided at the intake pipe 31. The compressor 32a is turned by a turbine 32b of the later explained turbocharger 32 provided coaxially with it and forcibly compresses the air. Note that instead of the turbocharger 32, it is also possible to use a supercharger mechanically driven utilizing the rotational force of a crankshaft (not shown).

The intercooler 33 is provided downstream from the compressor 32a in the intake pipe 31 and cools the air which was compressed by a compressor 32a and thereby became high in temperature.

The intake manifold 34 is provided with the surge tank 34a and a plurality of intake runners 34b branched from the surge tank 34a and connected with openings of intake ports 14 (see FIG. 2) formed inside of the engine body 1. The air guided to the surge tank 34a is evenly distributed through the intake runners 34b and intake ports 14 to the insides of the combustion chambers 11. In this way, the intake pipe 31, intake manifold 34, and intake ports 14 form an intake passage for guiding air to the insides of the combustion chambers 11. At the surge tank 34a, a pressure sensor 213 for detecting the pressure inside the surge tank 34a (intake pressure) and a temperature sensor 214 for detecting the temperature inside the surge tank 34a (intake temperature) are attached.

The throttle valve 35 is provided inside the intake pipe 31 between the intercooler 33 and the surge tank 34a. The throttle valve 35 is driven by a throttle actuator 35a and makes the passage cross-sectional area of the intake pipe 31 change continuously or in stages. By using the throttle actuator 35a to adjust the opening degree of the throttle valve 35, it is possible to adjust the amount of flow of air taken into the combustion chambers 11.

The air flow meter 212 is provided at the upstream side from the compressor 32a inside the intake pipe 31. The air flow meter 212 detects the amount of flow of air flowing through the intake passage and finally taken into the combustion chambers 11 (below, referred to as the "intake air amount").

The EGR passage 36 is a passage which connects the later explained exhaust manifold 40 and the surge tank 34a of the intake manifold 34 and returns part of the exhaust discharged from the combustion chambers 11 to the surge tank 34a using the pressure difference. Below, the exhaust introduced into the EGR passage 36 will be called the "EGR gas" and the ratio of the amount of EGR gas in the amount of gas in the cylinders, that is, the rate of recirculation of the exhaust, will be called the "EGR rate". By making the EGR gas be recirculated to the surge tank 34a and in turn the combustion chambers 11, it is possible to reduce the combustion temperature and keep down the discharge of nitrogen oxides ($NO_x$).

The EGR cooler 37 is provided at the EGR passage 36. The EGR cooler 37 is a heat exchanger for cooling the EGR gas by, for example, running wind, cooling water, etc.

The EGR valve 38 is provided at the downstream side in the flow direction of the EGR gas from the EGR cooler 37 in the EGR passage 36. The EGR valve 38 is a solenoid valve able to be adjusted in opening degree continuously or in stages. The opening degree is controlled by the electronic control unit 200. By controlling the opening degree of the EGR valve 38, the flow rate of the EGR gas recirculated to the surge tank 34a is adjusted. That is, by controlling the opening degree of the EGR valve 38 to a suitable opening degree in accordance with the intake air amount or intake pressure (supercharging pressure) etc., it is possible to control the EGR rate to any value.

The exhaust system 4 is a system for purifying the exhaust generated inside the combustion chambers and discharging it to the outside air and is provided with the exhaust manifold 40, exhaust pipe 41, turbine 32b of the turbocharger 32, and exhaust after-treatment device 42.

The exhaust manifold 40 is provided with a plurality of exhaust runners which are connected to openings of exhaust ports 15 (see FIG. 2) formed inside the engine body 1 and a header which collects the exhaust runners and merges them into one.

The exhaust pipe 41 is connected at one end to a header of the exhaust manifold 40 and is open at the other end. The exhaust discharged from the combustion chambers 11 through the exhaust ports to the exhaust manifold 40 flows through the exhaust pipe 41 and is discharged to the outside air.

The turbine 32b is a part forming a portion of the turbocharger 32 and is provided at the exhaust pipe 41. The turbine 32b is turned by energy of the exhaust and drives the coaxially provided compressor 32a.

At the outside of the turbine 32b, a variable nozzle 32c is provided. The variable nozzle 32c functions as a throttle valve. The nozzle opening degree of the variable nozzle 32c (valve opening degree) is controlled by the electronic control unit 200. By changing the nozzle opening degree of the variable nozzle 32c, it is possible to change the flow rate of the exhaust driving the turbine 32b. That is, by changing the nozzle opening degree of the variable nozzle 32c, it is possible to change the rotational speed of the turbine 32b and change the supercharging pressure. Specifically, if making the nozzle opening degree of the variable nozzle 32c smaller (throttling the variable nozzle 32c), the flow rate of the exhaust will rise and the rotational speed of the turbine 32b will increase resulting in an increase of the supercharging pressure.

The exhaust after-treatment device 42 is provided at the downstream side from the turbine 32b in the exhaust pipe 41. The exhaust after-treatment device 42 is a device for purifying the exhaust and then discharging it to the outside air and contains various types of catalysts for removing harmful substances (for example, a three-way catalyst) carried on a support.

The intake valve operating system 5 is a system for driving operation of the intake valves 50 of the cylinders 10 and is provided at the engine body 1. The intake valve operating system 5 according to the present embodiment is configured to enable control of the operating timings of the intake valves 50, for example, to drive operation of the intake valves 50 by electromagnetic actuators.

The exhaust valve operating system 6 is a system for driving operation of the exhaust valves 60 of the cylinders 10 and is provided at the engine body 1. The exhaust valve operating system 6 according to the present embodiment is configured to enable control of the operating timings of the exhaust valves 60, for example, to drive operation of the exhaust valves by electromagnetic actuators.

Note that, the intake valve operating system 5 and exhaust valve operating system 6 are not limited to electromagnetic actuators. For example, it is also possible to use a camshaft to drive the operation of the intake valves 50 or exhaust valves 60 and provide at one end of the camshaft a variable valve operation mechanism changing the relative phase angle of the camshaft to the crankshaft by hydraulic control to thereby enable control of the operating timings of the intake valves 50 or exhaust valves 60.

The electronic control unit 200 is comprised of a digital computer having components connected with each other by a bidirectional bus 201 such as a ROM (read only memory) 202, RAM (random access memory) 203, CPU (microprocessor) 204, input port 205, and output port 206.

At the input port 205, output signals of the above-mentioned fuel pressure sensor 211 etc. are input through corresponding AD converters 207. Further, at the input port 205, the output voltage of a load sensor 221 generating an output voltage proportional to the amount of depression of an accelerator pedal 220 (below, referred to as the "amount of accelerator depression" is input as a signal for detection of the engine load through a corresponding AD converter 207. Further, at the input port 205, as signals for calculating the engine rotational speed etc., the output signal of the crank angle sensor 222 generating an output pulse every time the crankshaft of the engine body 1 rotates by for example 15° is input. In this way, at the input port 205, output signals of various sensors required for control of the internal combustion engine 100 are input.

The output port 206 is connected through corresponding drive circuits 208 to the fuel injectors 20 and other controlled parts.

The electronic control unit 200 outputs control signals for controlling the different controlled parts from the output port 206 based on the output signals of various sensors input to the input port 205 so as to control the internal combustion engine 100. Below, the control of the internal combustion engine 100 which the electronic control unit 200 performs, in particular the combustion control of the fuel inside of the combustion chambers 11, will be explained.

Figure 3:
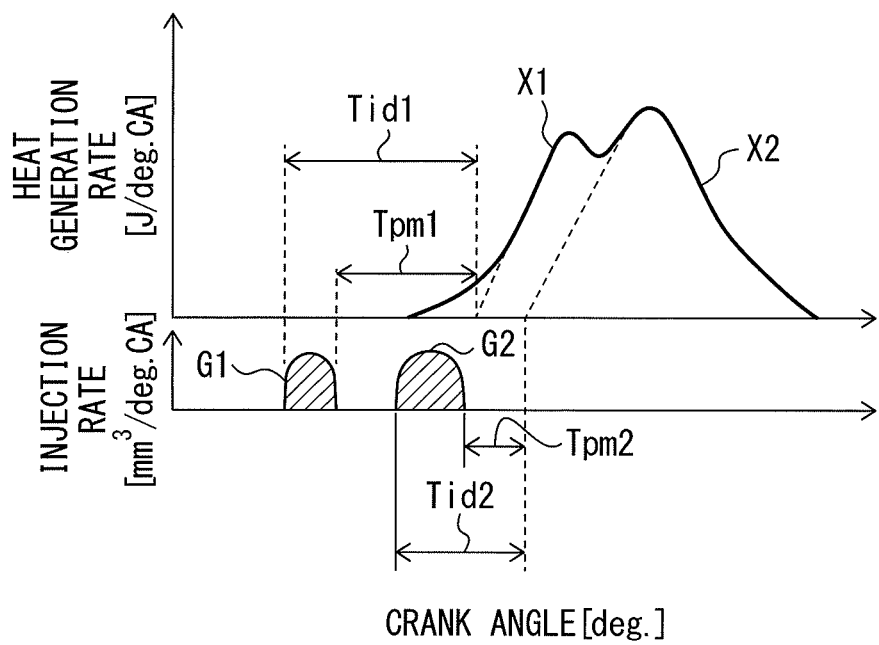
FIG. 3 is a view showing a relationship between a crank angle and heat generation rate when performing the combustion control according to one embodiment of the present disclosure to make fuel burn in a combustion chamber.
Figure 4:
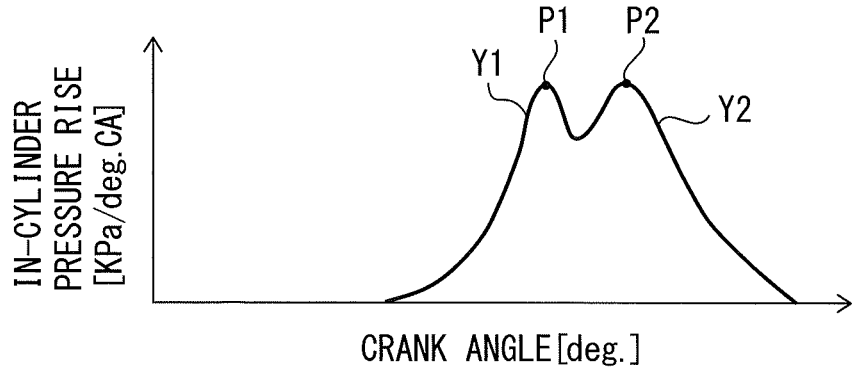
FIG. 4 is a view showing a relationship between a crank angle and rate of cylinder pressure rise when performing the combustion control according to one embodiment of the present disclosure to make fuel burn in a combustion chamber.

FIG. 3 is a view showing the relationship between the crank angle and heat generation rate in the case of performing the combustion control according to the present embodiment to make fuel burn in a combustion chamber 11 at the time when the engine operating state (engine rotational speed and engine load) is a certain steady state operation. Further, FIG. 4 is a view showing the relationship between the crank angle and the rate of cylinder pressure rise in this case.

Note that the "heat generation rate $(dQ/d\theta)$ [J/deg·CA]" is the amount of heat per unit crank angle generated when making fuel burn, that is, the amount Q of heat generated per unit crank angle. In the following explanation, the combustion waveform showing this relationship between the crank angle and heat generation rate, that is, the combustion waveform showing the change over time of the heat generation rate, will be called the "heat generation rate pattern". Further, the "rate of cylinder pressure rise $(dP/d\theta)$ [kPa/deg·CA]" is the crank angle differential of the cylinder pressure P [kPa]. In the following explanation, the pressure waveform showing this relationship between the crank angle and the rate of cylinder pressure rise, that is, the pressure waveform showing the change over time of the rate of cylinder pressure rise, will be called the "cylinder pressure rise pattern".

As shown in FIG. 3, the electronic control unit 200 divides the main fuel injection performed for outputting a demanded torque corresponding to the engine load into a first main fuel injection G1 and second main fuel injection G2 which it successively performs to operate the engine body 1.

At this time, in the present embodiment, the fuel injected by the first main fuel injection G1 into a combustion chamber 11 (below, referred to as the "first main fuel") and the fuel injected by the second main fuel injection G2 into a combustion chamber 11 (below, referred to as the "second main fuel") are burned after a certain extent of premix time with the air after fuel injection, that is, are ignited by "premix charged compressive ignition", by controlling the injection amounts and injection timings of the fuel injections G1, G2 to cause generation of heat two times in stages.

That is, as shown in FIG. 3, to enable a first peak of a combustion waveform X1 of the heat generation rate pattern to be formed by generation of heat mainly when the first main fuel is burned and then a second peak of a combustion waveform X2 of the heat generation rate pattern to be formed by generation of heat mainly when the second main fuel is burned, the injection amounts and injection timings of the fuel injections G1, G2 are controlled so that the heat generation rate pattern becomes a two-peak shape.

Further, due to this, as shown in FIG. 4, a first peak of a pressure waveform Y1 of the cylinder pressure rise pattern is formed by generation of heat mainly when the first main fuel is burned and then a second peak of a pressure waveform Y2 of the cylinder pressure rise pattern is formed by generation of heat mainly when the second main fuel is burned whereby the cylinder pressure rise pattern also becomes a two-peak shape along with the heat generation rate pattern.

By causing heat to be generated two times in stages with a suitable time between them in this way, it is possible to shift the phase of the pressure wave produced by the second heat generation (in the present embodiment, the pressure wave arising mainly when the second main fuel is burned) with respect to the phase of the pressure wave produced by the first heat generation (in the present embodiment, the pressure wave arising mainly when the first main fuel is burned). For this reason, for example, it is possible to make the phase of the second pressure wave an inverse phase to the phase of the first or otherwise suitably shift the phases of the two pressure waves to thereby reduce the amplitude of the actual pressure wave causing combustion noise generated due to the superposition of these two pressure waves.

Further, the magnitude of the amplitude of the pressure wave arising due to the first heat generation is in a proportional relationship with the magnitude of the peak value P1 of the first peak of the pressure waveform Y1 of the cylinder pressure rise pattern (below, referred to as the "first peak value"). Similarly, the magnitude of the amplitude of the pressure wave arising due to the second heat generation is in a proportional relationship with the magnitude of the peak value P2 of the second peak of the pressure waveform Y2 of the cylinder pressure rise pattern (below, referred to as the "second peak value"). Therefore, when the magnitudes of the first peak value P1 and the second peak value P2 are the same (that is, when P1:P2=1:1), the effect of reduction of combustion noise becomes the greatest.

Therefore, in the present embodiment, as shown in FIG. 4, the injection amounts and injection timings of the fuel injections G1, G2 are controlled so that the magnitudes of the first peak value P1 and the second peak value P2 become substantially the same, specifically, the value PR of the ratio of the first peak value P1 and the second peak value P2 (=P1/P2; below, referred to as the "peak ratio") falls within a predetermined range (for example, 0.9 to 1.1 in range). Due to this, it is possible to effectively suppress combustion noise when performing premix charged compressive ignition to operate the engine body 1.

In this way, the electronic control unit 200 according to the present embodiment sets a target injection amount Q1 and target injection timing A1 of the first main fuel injection G1 and a target injection amount Q2 and target injection timing A2 of the second main fuel injection G2 based on the engine operating state so that the cylinder pressure rise pattern when performing the premix charged compressive ignition becomes the desired shape (two-peak shape and shape with peak ratio PR falling within predetermined range). That is, the electronic control unit 200 controls the target injection amounts Q1, Q2 and target injection timings A1, A2 of the fuel injections G1, G2 to target values set in advance by experiments etc. based on the engine operating state so that the cylinder pressure rise pattern when performing the premix charged compressive ignition becomes the desired shape.

In this regard, in addition to the injection amounts and injection timings of the fuel injections G1, G2, the electronic control unit 200 also controls for example the intake pressure (supercharging pressure) or intake temperature, EGR rate, and other parameters of the intake system having an effect on the premix charged compressive ignition to target values corresponding to the engine operating state and thereby controls the oxygen density in the combustion chambers 11 to a target oxygen density corresponding to the engine operating state. That is, the electronic control unit 200 controls the intake system 3 in accordance with the engine operating state so that the oxygen density in the combustion chambers 11 becomes a target oxygen density corresponding to the engine operating state.

However, at the time of a transitional operation from when the engine load increases until it converges to a certain engine load, that is, at the time of a transitional operation when the engine load increases until the engine output torque becomes a demanded torque corresponding to the engine load, even if controlling the intake system 3 so that the parameters of the intake system become target values corresponding to the engine operating state, due to the delay in response of the intake system, sometimes the parameters of the intake system will transitionally end up deviating from the target values and the oxygen density in the combustion chambers 11 will transitionally end up becoming higher than the target oxygen density.

If in this way the oxygen density in the combustion chambers 11 transitionally ends up becoming higher than the target oxygen density, the ignition delay times Tid1, Tid2 of the fuel injected by the fuel injections G1, G2 (times from timings of start of fuel injections to when fuel injected by the fuel injections ignite, see FIG. 3) will also transitionally end up becoming shorter.

Further, at the time of transitional operation where the engine load increases, the target injection amounts Q1, Q2 of the fuel injections G1, G2 will increase along with an increase in the demanded torque, so as a result the fuel injection times of the fuel injections G1, G2 will end up becoming longer.

For this reason, at the time of a transitional operation where the engine load increases, sometimes the premix times Tpm1, Tpm2 of the fuel injected by the fuel injections G1, G2 with the air (times from when fuel injections end to when fuel injected by the fuel injections ignite. see FIG. 3) will end up becoming transitionally short.

In particular, if, like in the present embodiment, dividing the main fuel injection into the first main fuel injection G1 and the second main fuel injection G2 and successively performing them, the second main fuel injection G2 is performed after the first main fuel injection G1. For this reason, regardless of whether the operation is a steady state operation or transitional operation, the ignition delay time Tid2 of the second main fuel (below, referred to as the "second ignition delay time") tends to become shorter than the ignition delay time Tid1 of the first main fuel (below, referred to as the "first ignition delay time") and the premix time Tpm2 of the second main fuel with air (below, referred to as the "second premix time") tends to become shorter than the premix time Tpm1 of the first main fuel with air (below, referred to as the "first premix time").

Therefore, at the time of a transitional operation where the engine load increases etc., sometimes the second premix time Tpm2 can no longer be sufficiently secured and the degree of premix of the second main fuel with the air becomes insufficient resulting in a premix with a higher fuel concentration than the time of steady state operation ending up being burned. If such a premix with a high fuel concentration ends up being burned, formation of soot causing smoke is aggravated due to the insufficient oxygen at the time of combustion and the exhaust emissions are liable to deteriorate.

Therefore, in the present embodiment, the second premix time Tpm2 when injecting the normal target injection amount Q2 set in accordance with the engine load (demanded torque) by the second main fuel injection G2 is estimated and it is judged if the second premix time Tpm2 is less than a premix time enabling the smoke in the exhaust to be kept to within an allowable range (below, referred to as the "first threshold value").

Figure 5:
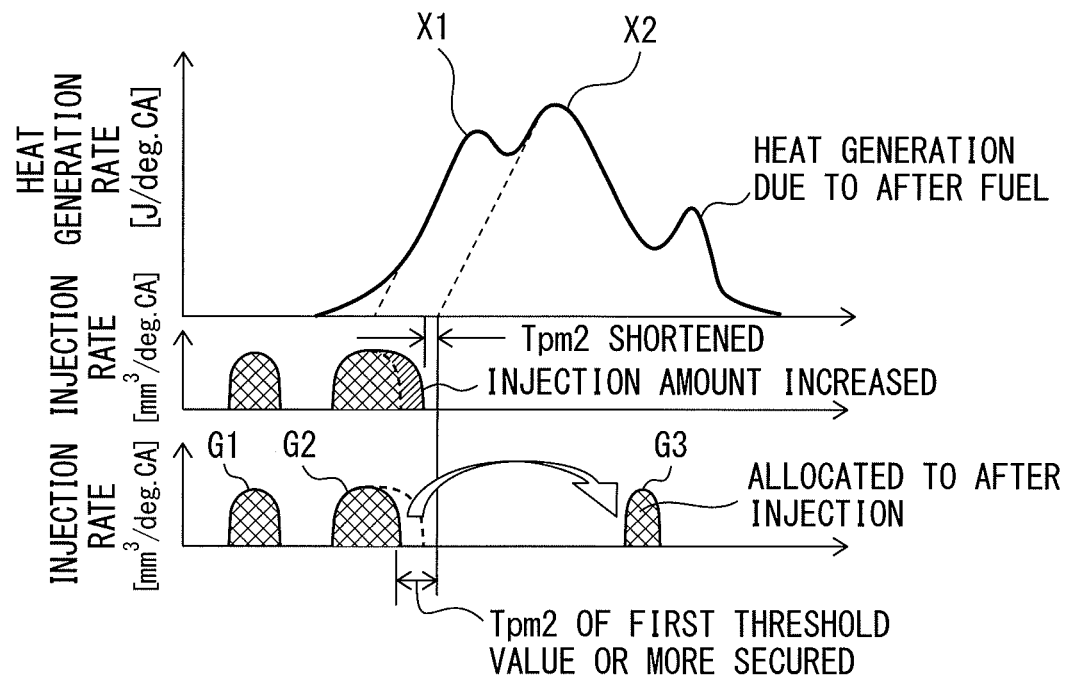
FIG. 5 is a view showing a relationship between a crank angle and heat generation rate when performing the combustion control according to one embodiment of the present disclosure to make fuel burn in a combustion chamber in the case where the second premix time becomes less than the first threshold value.

Further, as shown in FIG. 5, if the second premix time Tpm2 becomes less than the first threshold value, to secure the second premix time Tpm2 (to make the second premix time Tpm2 the first threshold value or more), the target injection amount Q2 of the second main fuel injection G2 is reduced to shorten the injection time period of the second main fuel injection G2 and the reduced amount of fuel is injected by after fuel injection G3 performed after the second main fuel injection G2.

Due to this, it is possible to secure the second premix time Tpm2, so it is possible to keep the exhaust emissions from deteriorating.

On the other hand, as explained before, in the present embodiment, the target injection amount Q2 of the second main fuel injection G2 is set so that the cylinder pressure rise pattern when performing premix charged compressive ignition becomes the desired shape, so if reducing the target injection amount Q2, sometimes the peak value of the combustion waveform X2 of the second peak of the heat generation rate pattern and in turn the peak value P2 of the combustion waveform Y2 of the second peak of the cylinder pressure rise pattern will greatly fall. That is, if reducing the target injection amount Q2, sometimes it will no longer be possible to maintain the cylinder pressure rise pattern at the desired shape.

Figure 6:
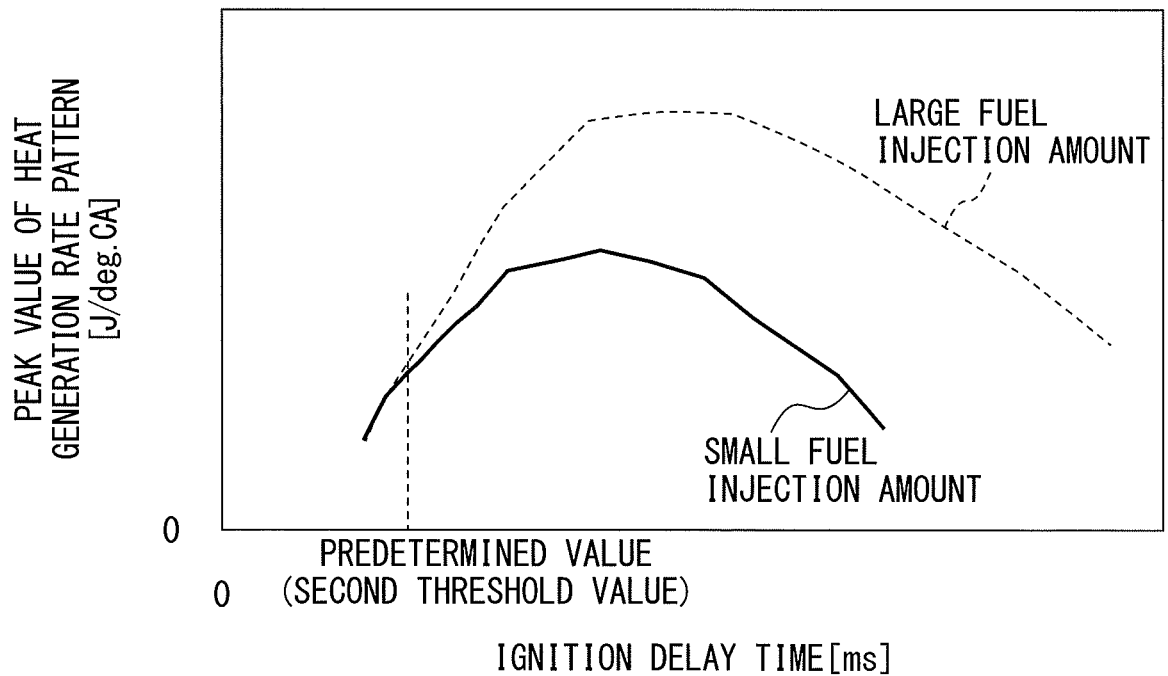
FIG. 6 is a view showing the relationship between the peak value of a heat generation rate pattern and an ignition delay time comparing when the amount of fuel injection is large and when it is small.

FIG. 6 is a view showing the relationship between the peak value of a heat generation rate pattern and an ignition delay time in the case of injecting fuel from a fuel injector 20 just one time to perform premix charged compressive ignition comparing when the amount of fuel injection is large and when it is small.

As shown in FIG. 6, if comparing the peak values of heat generation rate patterns between when the fuel injection amount is large and when it is small, it is learned that when the ignition delay time is shorter than a predetermined value, there is almost no difference in the size of the peak value. Further, it is learned that as the ignition delay time becomes longer than a predetermined value, gradually a difference starts to arise in the size of the peak value and the difference becomes larger.

This is probably caused by the fact that if the ignition delay time when performing premix charged compressive ignition becomes shorter, part of the fuel in the fuel injected from the fuel injector 20 will be insufficiently premixed with the air and will end up being burned by a form of combustion closer to diffusion combustion than premix charged compressive ignition.

Premix charged compressive ignition is a form of combustion where after injection of fuel, a certain extent of premix time with air is set and the fuel (premix) dispersed inside the combustion chamber 11 is made to self ignite at multiple points at the same timings, so compared to diffusion combustion where the fuel injected into a combustion chamber 11 is made to burn substantially without delay after the fuel is injected, the combustion speed becomes faster and the combustion time becomes shorter. For this reason, if performing premix charged compressive ignition, the peak values of the heat generation rate pattern tend to become larger than when performing diffused combustion. Further, the peak values of the heat generation rate pattern basically depend on the amount of fuel ignited by premix charged compressive ignition and tend to become higher the greater the amount of fuel.

Therefore, as shown in FIG. 6, when the ignition delay time is shorter than a predetermined value, regardless of the size of the fuel injection amount, generally constant fuel will ignite by premix charged compressive ignition and the remaining fuel will burn by a form of combustion close to diffusion combustion, so probably almost no difference will arise in the sizes of the peak values of the heat generation rate patterns. Further, as the ignition delay time becomes longer than the predetermined value, the greater the fuel injection amount, the more the fuel which ignites by premix charged compressive ignition, so probably a difference will start to arise in the sizes of the peak values and that difference will become greater.

In this way, as a result of intensive research of the inventors, it was learned that if the ignition delay time when performing the premix charged compressive ignition is shorter than a certain predetermined value (second threshold value), even if changing the fuel injection amount, the peak value of the heat generation rate pattern and in turn the peak value of the cylinder pressure rise pattern will not change much at all.

Therefore, in the present embodiment, in addition to the second premix time Tpm2, further the second ignition delay time Tid2 is estimated. When the second ignition delay time Tid2 is less than a second threshold value corresponding to the predetermined value explained with reference to FIG. 6, the target injection amount Q2 is reduced to shorten the injection time of the second main fuel injection G2 so that the second premix time Tpm2 becomes the first threshold value or more. The reduced amount of fuel is injected by after fuel injection G3 performed after the second main fuel injection G2. That is, when the second ignition delay time Tid2 is less than the second threshold value, the reduced amount q2 from the target injection amount Q2 (below referring to as the "second reduction correction amount") is calculated so that the second premix time Tpm2 becomes a predetermined value or more and the target injection amount Q2 of the after fuel injection G3 is set to the second reduction correction amount q2.

On the other hand, if ending up reducing only the target injection amount Q2 when the second ignition delay time Tid2 is the second threshold value or more, the second peak value P2 of the cylinder pressure rise pattern ends up falling and the cylinder pressure rise pattern can no longer be maintained at the desired shape.

Therefore, in the present embodiment, the target injection amount Q1 and target injection amount Q2 are respectively reduced so that the second premix time Tpm2 becomes a predetermined value or more and the cylinder pressure rise pattern can be maintained at the desired shape when the second ignition delay time Tid2 is the second threshold value or more and the reduced amounts of fuel are injected by the after fuel injection G3.

At this time, as explained above, the second ignition delay time Tid2 tends to become shorter than the first ignition delay time Tid1. For this reason, if ending up reducing the same amount of fuel as the amount of fuel reduced from the target injection amount Q2 from the target injection amount Q1 so that the second premix time Tpm2 becomes the first threshold value or more, the peak value of the first peak of the combustion waveform X1 of the heat generation rate pattern arising due to the generation of heat when the first main fuel with the long ignition delay time burns will end up greatly falling from the peak value of the second peak of the combustion waveform X2 of the heat generation rate pattern arising due to the generation of heat when the second main fuel with the short ignition delay time burns. As a result, the first peak value P1 of the cylinder pressure rise pattern will end up becoming much smaller than the second peak value P2 and the cylinder pressure rise pattern can no longer be maintained at the desired shape.

Therefore, to maintain the cylinder pressure rise pattern in a desired shape, it is necessary to make the reduction amount q1 from the target injection amount Q1 (below referred to as the "first reduction correction amount") smaller than the second reduction correction amount (reduction amount from target injection amount Q2) q2. Therefore, in the present embodiment, when the second ignition delay time Tid2 is a second threshold value or more, a second reduction correction amount q2 whereby the second premix time Tpm2 becomes the second threshold value or more is calculated and the first reduction correction amount q1 is calculated based on the second reduction correction amount q2, first ignition delay time Tid1, and second ignition delay time Tid2 so that the ratio of the first reduction correction amount q1 and second reduction correction amount q2 becomes an inverse ratio of the ratio of the first ignition delay time Tid1 and second ignition delay time Tid2, that is, q1:q2=1/Tid1: 1/Tid2(=Tid2:Tid1).

Due to this, it is possible to calculate a suitable first reduction correction amount q1 corresponding to the respective lengths of the first ignition delay time Tid1 and second ignition delay time Tid2. For this reason, it is possible to secure the second premix time Tpm2 and keep the exhaust emissions from deteriorating and possible to adjust the changes in the first peak value P1 and second peak value P2 of the cylinder pressure rise pattern to substantially the same extents, so it is possible to maintain the shape of the cylinder pressure rise pattern when performing premix charged compressive ignition at the desired shape.

Figure 7:
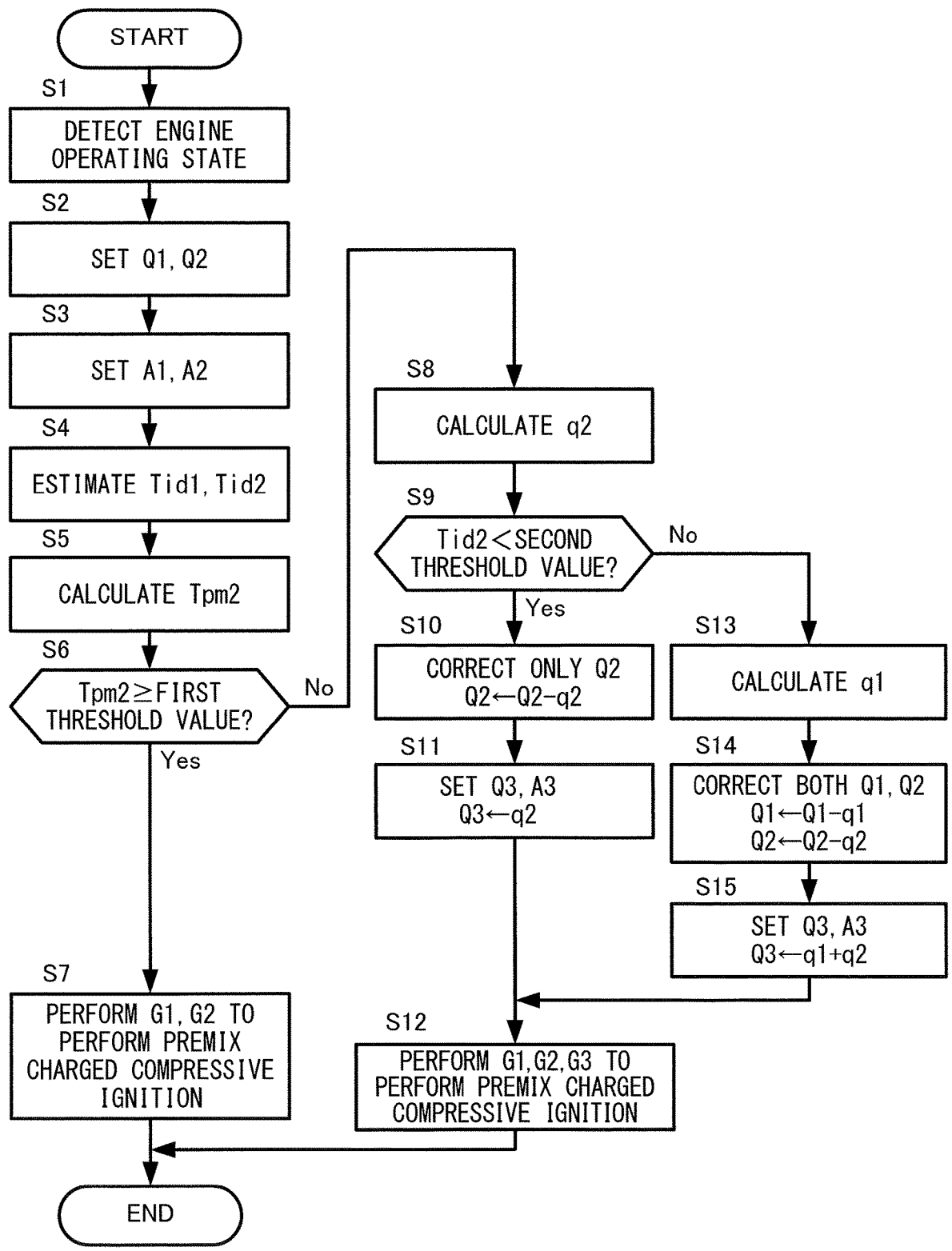
FIG. 7 is a flow chart explaining combustion control according to one embodiment of the present disclosure.

FIG. 7 is a flow chart for explaining the combustion control according to the present embodiment. The electronic control unit 200 repeatedly performs this routine during engine operation by a predetermined processing cycle.

At step S1, the electronic control unit 200 reads in the engine rotational speed calculated based on the output signal of the crank angle sensor 222 and the engine load detected by the load sensor 221 and detects the engine operating state.

At step S2, the electronic control unit 200 sets the target injection amount Q1 of the first main fuel injection G1 and the target injection amount Q2 of the second main fuel injection G2. In the present embodiment, the electronic control unit 200 refers to a table prepared in advance by experiments etc. and sets the target injection amount Q1 and target injection amount Q2 based on at least the engine load.

At step S3, the electronic control unit 200 sets the target injection timing A1 of the first main fuel injection G1 and the target injection timing A2 of the second main fuel injection G2. In the present embodiment, the electronic control unit 200 refers to a table prepared in advance by experiments etc. and sets the target injection timing A1 and target injection timing A2 based on the engine operating state.

At step S4, the electronic control unit 200 estimates the first ignition delay time Tid1 and second ignition delay time Tid2. In the present embodiment, the electronic control unit 200 estimates the first ignition delay time Tid1 and second ignition delay time Tid2 based on the intake air amount or intake pressure, the intake temperature, EGR rate, or other cylinder environmental conditions at the start of compression (for example, at the intake valve closing timing or when piston is positioned at bottom dead center) using an ignition delay time prediction model (for example, prediction model utilizing Livengood-Wu integral etc.).

At step S5, the electronic control unit 200 calculates a second premix time Tpm2. In the present embodiment, the electronic control unit 200 first calculates the estimated ignition timing of the second main fuel based on the target injection timing A2 and second ignition delay time Tid2. Next, the electronic control unit 200 calculates the injection end timing of the second main fuel injection G2 based on the target injection amount Q2 and target injection timing A2. Further, the electronic control unit 200 calculates the time from the injection end timing of the second main fuel injection G2 to the estimated ignition timing of the second main fuel as the second premix time Tpm2.

At step S6, the electronic control unit 200 judges if the second premix time Tpm2 is a predetermined first threshold value or more. As explained above, the first threshold value is set to a value enabling the smoke in the exhaust to be kept within an allowable range if the second premix time Tpm2 is the first threshold value or more. The electronic control unit 200 proceeds to the processing of step S7 if the second premix time Tpm2 is the first threshold value or more in particular since there is no need to reduce the target injection amount Q2. On the other hand, the electronic control unit 200 proceeds to the processing of step S8 if the second premix time Tpm2 is less than the first threshold value.

At step S7, the electronic control unit 200 performs the first main fuel injection G1 and second main fuel injection G2 to perform the premix charged compressive ignition.

At step S8, the electronic control unit 200 calculates the second reduction correction amount q2 so that the second premix time Tpm2 becomes the first threshold value or more. In the present embodiment, the electronic control unit 200 subtracts the second premix time Tpm2 calculated at step S5 from the first threshold value and calculates the amount of fuel injected by the second main fuel injection G2 during that reduced time period as the second reduction correction amount q2.

At step S9, the electronic control unit 200 judges if the second ignition delay time Tid2 is less than a predetermined second threshold value. As explained above, the second threshold value is set to a value in which almost no change is seen in the peak value of the heat generation rate pattern even if the target injection amount Q2 changes if the second ignition delay time Tid2 is less than the second threshold value. The electronic control unit 200 proceeds to the processing of step S10 if the second ignition delay time Tid2 is less than the second threshold value. On the other hand, the electronic control unit 200 proceeds to the processing of step S11 if the second ignition delay time is the second threshold value or more.

At step S10, the electronic control unit 200 corrects the target injection amount Q2. Specifically, the electronic control unit 200 subtracts the second reduction correction amount q2 from the target injection amount Q2.

At step S11, the electronic control unit 200 sets the target injection amount Q3 of the after fuel injection G3 to the second reduction correction amount q2 and sets the target injection timing A3 of the after fuel injection G3 based on the engine operating state.

At step S12, the electronic control unit 200 performs the first main fuel injection G1, second main fuel injection G2, and after fuel injection G3 to perform premix charged compressive ignition.

At step S13, the electronic control unit 200 calculates the first reduction correction amount q1 so that the cylinder pressure rise pattern is maintained at the desired shape. In the present embodiment, the electronic control unit 200 calculates the first reduction correction amount q1 based on the second reduction correction amount q2, the first ignition delay time Tid1, and the second ignition delay time Tid2 so that the ratio of the first reduction correction amount q1 and the second reduction correction amount q2 becomes an inverse ratio of the ratio of the first ignition delay time Tid1 and the second ignition delay time Tid2, that is, so that q1:q2=1/Tid1:1/Tid2 (=Tid2:Tid1).

At step S14, the electronic control unit 200 corrects the target injection amount Q1 and the target injection amount Q2. Specifically, the electronic control unit 200 subtracts the first reduction correction amount q1 from the target injection amount Q1 and subtracts the second reduction correction amount q2 from the target injection amount Q2.

At step S15, the electronic control unit 200 sets the target injection amount Q3 of the after fuel injection G3 to the total amount of the reduction correction amount q1 and the reduction correction amount q2 and sets the target injection timing A3 of the after fuel injection G3 based on the engine operating state.

According to the present embodiment explained above, there is provided an electronic control unit 200 (control device) for controlling an internal combustion engine 100 provided with an engine body 1 and a fuel injector 20 injecting fuel for making it burn in a combustion chamber 11 of the engine body 1. The control unit 200 comprises a combustion control part causing premix charged compressive ignition of fuel by successively performing at least a first main fuel injection G1 and a second main fuel injection G2 so as to cause heat to be generated in the combustion chamber 11 two times in stages and produce a pressure waveform showing a change over time of a rate of cylinder pressure rise (cylinder pressure rise pattern) which has two peaks.

Further the combustion control part comprises a second premix time calculating part calculating a second premix time Tpm2 which is an estimated value of a premix time of fuel injected by second main fuel injection G2 with air and is configured to reduce the injection amount of the second main fuel injection G2 so that the second premix time Tpm2 becomes a predetermined first threshold value or more and perform after fuel injection G3 after the second main fuel injection G2 when the second premix time Tpm2 is less than said first threshold value, and inject by the after fuel injection G3 the amount of fuel reduced from the injection amount of the second main fuel injection G2.

Due to this, it is possible to keep the second premix time Tpm2 from becoming less than the first threshold value and secure the second premix time Tpm2, so it is possible to keep the degree of premix of the second main fuel and air from ending up becoming insufficient. For this reason, it is possible to keep a premix with a high fuel concentration from ending up burning, so it is possible to keep soot which causes smoke from being produced and keep the exhaust emissions from deteriorating.

At this time, in the present embodiment, the second premix time Tpm2 is made the time from when the second main fuel injection G2 ends to when the fuel injected by the second main fuel injection G2 is ignited, so the degree of premix of second main fuel and air can be precisely judged.

Further, the combustion control part according to the present embodiment further comprises a second ignition delay time calculating part calculating a second ignition delay time Tid2 which is an estimated value of an ignition delay time of fuel injected by the second main fuel injection G2 (time from when second main fuel injection G2 is started to when fuel injected by that second main fuel injection G2 is ignited) and is configured to successively perform a first main fuel injection G1 and a second main fuel injection G2 so that a peak ratio PR which is the ratio of a first peak value P1 of a first peak and a second peak value P2 of a second peak of a pressure waveform showing the change along with time of the rate of cylinder pressure rise (cylinder pressure rise pattern) falls within a predetermined range, to reduce the respective injection amounts of the first main fuel injection G1 and second main fuel injection G2 so that the second premix time Tpm2 becomes a first threshold value or more and perform after fuel injection G3 after the second main fuel injection G2 when the second premix time Tpm2 is less than the first threshold value and the second ignition delay time Tid2 is a predetermined second threshold value or more, to inject the respective amounts of fuel reduced from the injection amounts of the first main fuel injection G1 and second main fuel injection G2 by the after fuel injection G3, and to reduce the amount of reduction from the injection amount of the first main fuel injection G1 (first reduction correction amount q1) more than the amount of reduction from the injection amount of the second main fuel injection G2 (second reduction correction amount q2).

In this way, when successively performing the first main fuel injection G1 and the second main fuel injection G2 so that the peak ratio PR of the cylinder pressure rise pattern falls within a predetermined range, if making the amount of injection of the second main fuel injection G2 change when the second ignition delay time Tid2 becomes the second threshold value or more, the second peak value P2 of the cylinder pressure rise pattern will end up greatly changing.

Further, the first ignition delay time Tid1 tends to become longer than the second ignition delay time Tid2. The longer the ignition delay time becomes, the more the peak value of the heat generation rate pattern when making the injection amount change and in turn the peak value of the cylinder pressure rise pattern will change.

Therefore, by reducing the first reduction correction amount q1 more than the second reduction correction amount q2, it is possible to keep the amount of change of the first peak value P1 and the amount of change of the second peak value P2 of the cylinder pressure rise pattern from ending up greatly differing. For this reason, it is possible to keep the exhaust emissions from deteriorating while keeping the shape of the cylinder pressure rise pattern from ending up greatly changing from the desired shape, so it is possible to keep the combustion noise from deteriorating as well.

In more detail, the combustion control part is further provided with a first ignition delay time calculating part calculating a first ignition delay time Tid1 which is an estimated value of an ignition delay time of fuel injected by a first main fuel injection G1 (time from time of start of the first main fuel injection G1 to when fuel injected by the first main fuel injection G1 is ignited) and is configured to set the reduction amount from the injection amount of the first main fuel injection G1 so that the ratio of the reduction amount from the injection amount of the first main fuel injection G1 (reduction correction amount q1) and the reduction amount from the amount of injection of the second main fuel injection G2 calculated so that the second premix time Tpm2 becomes the first threshold value or more (reduction correction amount q2) becomes the inverse ratio of the ratio of the first ignition delay time Tid1 and the second ignition delay time Tid2.

Due to this, it is possible to set the reduction correction amount q1 to a suitable amount based on the respective lengths of the first ignition delay time Tid1 and second ignition delay time Tid2 so that the reduction correction amount q1 becomes smaller than the reduction correction amount q2. For this reason, it is possible to adjust the changes of the first peak value P1 and second peak value P2 of the cylinder pressure rise pattern to be substantially the same extent, so it is possible to maintain the shape of the cylinder pressure rise pattern when performing the premix charged compressive ignition at the desired shape.

Above, embodiments of the present disclosure were explained, but the above embodiments only show some of the examples of application of the present disclosure and are not meant to limit the technical scope of the present disclosure to the specific configurations of the above embodiments.

For example, in the above embodiments, in addition to the first main fuel injection G1 and second main fuel injection G2, it is also possible to perform pilot injection or preinjection or other fuel injection other than main fuel injection.

The invention claimed is:

1. A control device for an internal combustion engine, the internal combustion engine comprising:
an engine body; and
a fuel injector configured to inject fuel into a combustion chamber of the engine body for combustion, and
the control device comprising a processor programmed to:
cause heat to be generated in the combustion chamber two times in stages to give a pressure waveform showing a change over time of a rate of cylinder pressure rise which has two peaks by controlling the fuel injector to successively perform at least a first main fuel injection and a second main fuel injection to cause premix charged compressive ignition of the fuel;
calculate a second premix time which is an estimated value of a premix time of fuel injected by the second main fuel injection with air;
reduce a fuel injection amount of the second main injection so that the second premix time becomes a predetermined first threshold value or more;
control the fuel injector to perform an after fuel injection after the second main fuel injection when the second premix time is less than the first threshold value,
calculate a second ignition delay time which is an estimated value of an ignition delay time of fuel injected by the second main fuel injection;
control the fuel injector to successively perform the first main fuel injection and the second main fuel injection so that a peak ratio which is a ratio of a first peak value of a first peak of the pressure waveform and a second peak value of a second peak falls in a predetermined range,
reduce the respective injection amounts of the first main fuel injection and the second main fuel injection so that the second premix time becomes the first threshold value or more and perform the after fuel injection when the second premix time is less than the first threshold value and the second ignition delay time is a predetermined second threshold value or more,
control the fuel injector to, by the after fuel injection, inject the respective amounts of fuel reduced from the injection amounts of the first main fuel injection and second main fuel injection; and
reduce an amount of fuel reduced from the fuel injection amount of the first main fuel injection more than an amount of fuel reduced from the injection amount of the second main fuel injection,
wherein an amount of fuel reduced from the fuel injection amount of the second main fuel injection is injected by the after fuel injection.

2. The control device for the internal combustion engine according to claim 1, wherein
the processor is further programmed to:
calculate a first ignition delay time which is an estimated value of an ignition delay time of the fuel injected by the first main fuel injection, and
set the amount of fuel reduced from the fuel injection amount of the first main fuel injection so that a ratio of the amount of fuel reduced from the fuel injection amount of the first main fuel injection and an amount of fuel reduced from the fuel injection amount of the second main fuel injection becomes an inverse ratio of the ratio of the first ignition delay time and the second ignition delay time.

3. The control device for the internal combustion engine according to claim 2, wherein
the first ignition delay time is the time from the time of start of the first main fuel injection to when fuel injected by the first main fuel injection is ignited.

4. The control device for the internal combustion engine according to claim 1, wherein
the second ignition delay time is the time from the time of start of the second main fuel injection to when fuel injected by the second main fuel injection is ignited.

5. The control device for the internal combustion engine according to claim 1, wherein the second premix time is the time from the time of end of the second main fuel injection to when fuel injected by the second main fuel injection is ignited.

6. An internal combustion engine comprising:
an engine body;
a fuel injector configured to inject fuel into a combustion chamber of the engine body for combustion; and
a processor programmed to:
cause heat to be generated in the combustion chamber two times in stages to give a pressure waveform showing a change over time of a rate of cylinder pressure rise which has two peaks by controlling the fuel injector to successively perform at least a first main fuel injection and a second main fuel injection to cause premix charged compressive ignition of the fuel;
calculate a second premix time which is an estimated value of a premix time of fuel injected by the second main fuel injection with air;
reduce the fuel injection amount of the second main injection so that the second premix time becomes a predetermined first threshold value or more; and
control the fuel injector to perform an after fuel injection after the second main fuel injection when the second premix time is less than the first threshold value;
calculate a second ignition delay time which is an estimated value of an ignition delay time of fuel injected by the second main fuel injection;
control the fuel injector to successively perform the first main fuel injection and the second main fuel injection so that a peak ratio which is a ratio of a first peak value of a first peak of the pressure waveform and a second peak value of a second peak falls in a predetermined range;
reduce the respective injection amounts of the first main fuel injection and the second main fuel injection so that the second premix time becomes the first threshold value or more and perform the after fuel injection when the second premix time is less than the first threshold value and the second ignition delay time is a predetermined second threshold value or more;
control the fuel injector to, by the after fuel injection, inject the respective amounts of fuel reduced from the injection amounts of the first main fuel injection and second main fuel injection; and
reduce an amount of fuel reduced from the fuel injection amount of the first main fuel injection more than an amount of fuel reduced from the injection amount of the second main fuel injection,
wherein an amount of fuel reduced from the fuel injection amount of the second main fuel injection is injected by the after fuel injection.

* * * * *